United States Patent [19]

Maher

[11] 4,324,750

[45] Apr. 13, 1982

[54] METHOD FOR MAKING HIGH K PLZT CERAMIC CAPACITOR

[75] Inventor: Galeb H. Maher, North Adams, Mass.

[73] Assignee: Sprague Electric Company, North Adams, Mass.

[21] Appl. No.: 178,669

[22] Filed: Aug. 18, 1980

Related U.S. Application Data

[63] Continuation-in-part of Ser. No. 2,837, Jan. 12, 1979, Pat. No. 4,219,866, which is a continuation-in-part of Ser. No. 802,160, May 31, 1977, Pat. No. 4,135,224, which is a continuation-in-part of Ser. No. 619,089, Oct. 2, 1975, Pat. No. 4,027,209.

[51] Int. Cl.$^3$ ............................................. C04B 35/49
[52] U.S. Cl. ..................................... 264/61; 264/235; 264/346; 361/321
[58] Field of Search .................... 264/61, 346, 235; 361/321

[56] References Cited

U.S. PATENT DOCUMENTS

| | | | |
|---|---|---|---|
| 2,541,833 | 2/1951 | Roberts | 252/63.5 |
| 3,732,117 | 5/1973 | Nitta | 252/63.5 |
| 4,027,209 | 5/1977 | Maher | 361/361 |
| 4,135,224 | 1/1979 | Maher | 361/321 |
| 4,219,866 | 8/1980 | Maher | 361/321 |

FOREIGN PATENT DOCUMENTS 2093279  1/1972  France ............................... 361/321

OTHER PUBLICATIONS

Atkin, Holman and Fulrath, Substitution of Bi and Nb Ions in Lead Zirconate–Titanate, J. Am. Ceramic Soc.; vol. 54, No. 2; Feb. 1971; pp. 113-115.

James and Messer, The Preparation of Transparent PLZT Ceramics from Oxide Powders by Liquid–Phase Sintering; Trans. and Journal of British Cer. Soc., vol. 74, 1978, pp. 152-158.

*Primary Examiner*—James H. Derrington
*Attorney, Agent, or Firm*—Connolly and Hutz

[57] ABSTRACT

A powder blend consisting essentially of precursors of a single antiferroelectric compound of lead-barium-lanthanum-zirconate titanate doped with silver, includes at least 0.7 mole percent bismuth permitting a near-full reaction to be achieved at calcining in the low temperature range of 1000° C. to 1130° C. A body is formed of the pulverized calcined material, which body is then sintered in a closed container at 1100° C. Residual PbO remains in the body rendering it conductive. The body is annealed in open atmosphere at 950° C. to drive out the free PbO providing an excellent dielectric having an unusual combination of high K and low TCC.

9 Claims, 3 Drawing Figures

METHOD FOR MAKING HIGH K PLZT CERAMIC CAPACITOR

This application is a continuation-in-part of Ser. No. 2,837, filed Jan. 12, 1979, now U.S. Pat. No. 4,219,866, which is a continuation-in-part of Ser. No. 802,160, filed May 31, 1977, now U.S. Pat. No. 4,135,224, which is a continuation-in-part of Ser. No. 619,089, filed Oct. 2, 1975, now U.S. Pat. No. 4,027,209.

BACKGROUND OF THE INVENTION

The present invention is related to a method for making a PLZT ceramic capacitor, and more particularly to including bismuth in the start materials, calcining at a low temperature and after sintering in a closed container, annealing to remove free lead oxide.

A silver doped PLZT (lead-lanthanum-zirconate-titanate) capacitor dielectric is described in the ancestral patent U.S. Pat. No. 4,027,209. The method disclosed there includes calcining the PLZT start materials at a peak temperature of 1232° C., adding silver and glass, forming a capcitor body and sintering at from 1038° to 1121° C. Also in a subsequent progenitor patent U.S. Pat. No. 4,135,224, bismuth trioxide is added to the calcined PLZT material to reduce the required sintering temperature and to accelerate the incorporation of silver in the PLZT grains at sintering. In the latter patent, full densification could be achieved at a peak sintering temperature as low as 1150° C. with no glass having been added. In the parent U.S. Pat. No. 4,219,866 issued Aug. 26, 1980, barium was added to the start materials to achieve a higher dielectric constant.

In the parent application, a ferroelectric dielectric was defined as being composed of a lead zirconate and a barium titanate wherein 0.07 and 0.16 molar parts of the lead are replaced by lanthanum, wherein from 0.10 to 0.40 molar parts of the zirconate are replaced by titanate, and wherein the atomic ratio of barium to lead is from 0.015 to 0.39. In the present disclosure, the term "antiferroelectric compound of lead-barium-lanthanum-zirconate-titanate" is to be interpreted as including only those compounds as defined and limited above. As in the parent patent, the dielectric compounds of this invention are preferably doped with silver and bismuth.

It is an object of the present invention to make such an antiferroelectric dielectric having a higher dielectric constant K without sacrifice in the stability of K over a broad operating temperature range.

SUMMARY OF THE INVENTION

A ceramic capacitor is made by forming a powder blend consisting essentially of precursors of a single antiferroelectric compound of lead-barium-lanthanum-zirconate-titanate doped with silver and bismuth, calcining this blend at less than 1130° C., pulverizing the calcined compound, forming a body of the pulverized compound, and sintering the body in a closed container. The sintered body is subsequently annealed at less than 1000° C. to drive out the free lead oxide from the body. At least two spaced electrodes are either applied to opposite faces of the sintered body or may be buried within the body prior to sintering.

It has been found that the addition of small amounts of bismuth, e.g. ½ weight percent $Bi_2O_3$, to the PLZT start materials permits the use of lower calcine temperatures that will result in full reaction and a solid solution of those start materials. Using bismuth in this way also advantageously expedites the incorporation of a silver dopant into the calcined PLZT compound. In the present invention the start PLZT materials need not be lead rich. In fact, they may be, and are preferably added in stoichiometric amounts that conform to an overall large/small cation balance in the start materials. Bismuth and silver atoms enter this system as large cations. At least one mechanism by which charge balance is attained in the grains at calcining involves the creation of lead vacancies in the crystal lattice. Accordingly, each two of the large cation donors, $La^{+3}$, occupy the sites of two $Pb^{+2}$ cations and a third $Pb^{+2}$ is removed leaving one lead vacancy. Thus one lead vacancy exists in the crystal for each two lanthanum atoms incorporated, and this lead shows up as a free lead oxide in the calcined material. This kind of mechanism is described in the paper by K. H. Hardtl and D. Hennings entitled Distribution of A-Site and B-site Vacancies in (Pb,La)(Ti,Zr)O3 Ceramics, Vol. 55, No. 5, pages 230 to 231. The incorporation of bismuth has the same lead displacement and lead vacancy result. Each silver $(Ag^{+1})$ cation charge balances a lanthanum $(La^{+3})$ or $(Bi^{+3})$ cation on a one to one basis and thus tends to reduce the expulsion of lead from the grains. The net free lead oxide is molten at the calcining temperatures and in effect reduces the temperature of calcining at which a full reaction of the start materials occurs to form stoichiometric PLZT grains. From weight loss measurements it was ascertained that the free lead oxide in the calcined materials of this invention amounts to as much as 1.5 weight percent but is typically from 0.2 to 0.5 weight percent. Materials that were calcined at the conventionally higher temperatures with no bismuth include essentially no free lead oxide.

However, not only does the presence of free lead oxide aid completion of the reaction at calcining so that lower calcining temperatures may be used, but lower calcining temperatures are preferred because at conventional calcine temperatures the free lead oxide solidifies and bonds the calcined cake so as to make it refractory and difficult to crush and pulverize. At calcining temperatures of about 1130° C. and lower, this problem is greatly ameliorated. At calcine temperatures lower than about 1000° C. it becomes impossible to achieve the desired full reaction of the start materials so that calcining is restricted to the temperature range of from 1000° C. to 1130° C.

In the previously noted U.S. Pat. No. 4,219,866, the addition of minor amounts of barium titanate to an antiferroelectric PLZT dielectric was seen to provide higher dielectric constants with only small changes in the temperature coefficient of capacitance (TCC) and the voltage coefficient of capacitance. In comparison with capacitors of that patent, capacitors made by the present method wherein bismuth is included in the start materials prior to calcining, are capable of providing substantially greater dielectric constants (K) for a given flatness in the K versus operating temperature characteristics. For example a capacitor body of this invention has a dielectric constant K of 2000 that varies with respect to room temperature no more than 15% from −55° C. to 125° C. (a so-called X7R characteristic, as designated by the Electronic Industries Association). Heretofore, PLZT bodies exhibiting an X7R characteristic have had a K of no more than 1700.

However, a special difficulty presented itself as a result of the low temperature calcining step. Minute amounts of free lead oxide that do not react at the low temperature calcining step remain as a small second phase between the grains of the capacitor dielectric to cause a greatly reduced life characteristic. This is attributed to the fact that PbO tends to be semiconducting.

It has been found that the free lead oxide may be removed by annealing the sintered body in an open atmosphere. This additional step provides capacitors having long life times that are commensurate with or better than those obtained by the old method wherein calcining was accomplished at a higher temperature. The old higher temperature calcining drove out free lead oxide at the calcining step. In the method of this invention, the dielectric constant increases about 5% as a result of annealing due to the elimination to the atmosphere of the lead oxide from the grain boundaries. Based upon weight loss measurements at annealing, there has been observed a loss of from 0.125 to 1.5 weight percent lead oxide. Thus the combination in the method of this invention of adding bismuth to the PLZT start materials, calcining at a low temperature and a post anneal step provides capacitors having an exceptionally useful combination of properties, and no other method is known by which such capacitors may be made.

DESCRIPTION OF THE PREFERRED EMBODIMENTS

Figure 1:
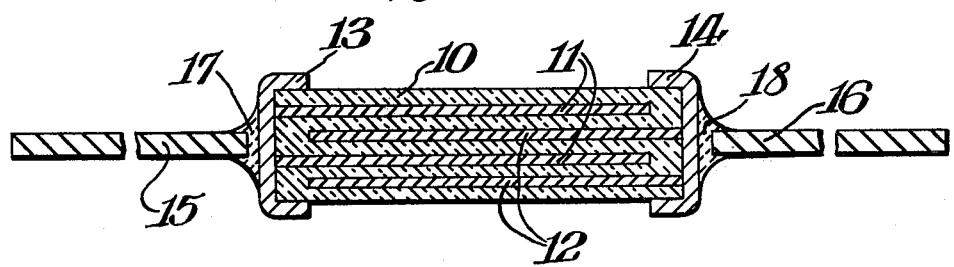
FIG. 1 shows in side sectional view a monolithic ceramic capacitor of this invention.

The monolithic ceramic capacitor of FIG. 1 has a ceramic body 10. Film electrodes 11 are interleaved with film electrodes 12 all electrodes being buried in the body 10. Conductive termination coatings 13 and 14 contact electrodes 11 and 12, respectively. Lead wires 15 and 16 are attached by solder bonds 17 and 18 to terminations 13 and 14, respectively. Although the capacitor of FIG. 1 has three active ceramic dielectric layers, between adjacent and oppositely polarized electrodes, experimental monolithic capacitors to be described herein, have more active dielectric layers.

Figure 2:
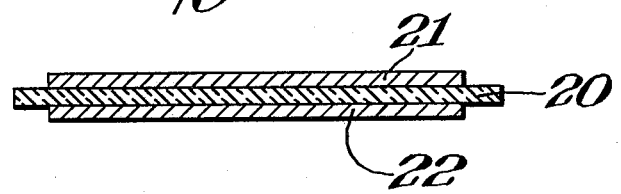
FIG. 2 shows in side sectional view a ceramic chip capacitor of this invention.

The chip capacitor of FIG. 2 has a ceramic body 20 and two film electrodes 21 and 22 on the opposite major surfaces of the body 20, respectively. Chip capacitors may have a rectangular or circular shape, and for high voltage uses may have a thickness equaling or exceeding the largest dimension of a major surface.

A brief description of the steps employed for making experimental capacitors is as follows:

A powder blend was prepared consisting by weight of 55.0 PbO, 5.70 $La_2O_3$, 3.40 BaO, 0.68 Ag(metal), 1.47 $Bi_2O_3$, 24.7 ZrO and 9.0 $TiO_2$. The blend was ball milled and precalcined at 790° C. for 5 hours. The resulting cake was then granulated mechanically and calcined in a closed high purity aluminum sagger at 1090° C. for 3 hours. The calcined cake was crushed and jet pulverized to form a fine ceramic powder.

X-ray diffraction analysis of this material showed lattice parameters corresponding to a single PLZT compound and also corresponding to X-ray lattice parameters exhibited by a dense sintered body subsequently formed of this material. In a series of experiments wherein the calcining temperature was varied from 1010° C. to 1120° C., the same result was obtained indicating that for this low range of calcining temperatures the start materials are substantially fully reacted at calcining and the crystalline structure of the sintered body (sintering at 1100° C.) was essentially unchanged from that of the calcined cake.

The above noted start materials correspond to a compound

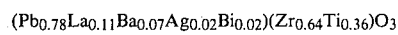

$(Pb_{0.78}La_{0.11}Ba_{0.07}Ag_{0.02}Bi_{0.02})(Zr_{0.64}Ti_{0.36})O_3$ which compound is formed with lead vacancies at calcining and is structurally that of the grains in the subsequently sintered dielectric. Because of the existence of lead vacancies, there is slightly less lead in the grains than indicated by this formula.

At this point, the calcined and pulverized powder may or may not be mixed with a sintering aid such as a glass or other low melting sintering flux. Also small amounts of materials such as $TiO_2$ or $Nb_2O_5$ may be added to the calcined powder to react with and tie up the free lead oxide. However, even with such additives, some free lead remains and annealing is found necessary to insure good life test performance. Such additives also produce an integranular phase and reduce the dielectric constant.

The calcined powder or powder mixture was stirred with an organic binder medium of essentially turpentine, 6% pine oil and 5% lecithin to produce a dispersion or slurry containing about 70% by weight of solids. This slurry was ball milled for about 10 hours.

Eight groups of experimental monolithic capacitors were produced by applying successive coatings of the above noted milled slurry to a substrate, drying each layer in turn and screen printing an electroding paste of 70% silver and 30% palladium particles onto each except the last of the dried layers of the dielectric material. Each layer is about 1 mil (0.025 mm) thick.

This assembly of dried layers with seven interleaved films of electroding paste was then diced into a multiplicity of square bodies and baked at 870° C. to remove the organic material. The electrodes were so arranged that after dicing, each body had the alternate of the electrodes extending to one cut end of the body and the other electrodes extend to the opposite cut end of the body as illustrated in FIG. 1. The body was subsequently buried in lead zirconate powder and sintered in a closed alumina crucible at a peak temperature of 1100° C. for 2½ hours. Closed container sintering is preferred with the container substantially filled with the bodies to be sintered, because this results in maintaining a positive atmosphere of lead oxide leading to the retention during sintering of the lead oxide that acts by itself as a sintering aid so that densification is achieved at this low sintering temperature.

Removal of free lead oxide was then accomplished by annealing the experimental sintered bodies of examples 1, 3, 5, 7 and 8, in an open atmosphere at 950° C. for 1 hour. The bodies in examples 2, 4 and 6 were not annealed. A silver paste was applied to the opposite ends of the sintered body and the body was heated to about 760° C. for 5 minutes to form cured terminals, e.g. 13 and 14 in FIG. 1. Lead wires 15 and 16 were then soldered to each of the two silvered terminals 13 and 14.

Chip capacitors as illustrated in FIG. 2 may be made by casting the above noted slurry on a glass plate to a thickness of about 0.020 inch (0.051 cm), drying the cast layer, removing the dried layer and cutting it into square pieces (e.g. 20) each having an area of 0.25 in² (1.6 cm²). The binder is then removed by baking and the chips are then sintered in a closed crucible. A silver paste may be applied over the two opposite major surfaces of the mature chips and the chips heated to 790° C. for ½ hour to cure the electrodes 21 and 22 illustrated in FIG. 2.

The experimental variables for the eight lots of monolithic capacitors are indicated in Table I.

TABLE I

| Experiment Number | Additive to Calcined Powder (wt %) | Annealed | Weight Loss (wt %) | K at 25° C. | D.F. (%) | TCC (%Δ rel. 25° C.) −55° C. | TCC (%Δ rel. 25° C.) +125° C. | Life Test Results (No. failures/No. tested/ Time tested) |
|---|---|---|---|---|---|---|---|---|
| 1 | 0 | Yes | n.d. | 2100 | 0.05 | −7.5 | −14.0 | 0/12/100 hr. |
| 2 | 0.5TiO$_2$ | No | — | 2100 | 0.20 | −7.5 | −12.0 | 12/12/1 hr. |
| 3 | 0.5TiO$_2$ | Yes | n.d. | 2200 | 0.10 | −7.5 | −12.0 | 0/12/100 hr. |
| 4 | 0.1TiO$_2$ | No | — | 1750 | 0.45 | −5.0 | −10.0 | 6/10/48 hr. |
| 5 | 1.0TiO$_2$ | Yes | 0.2 | 1900 | 0.40 | −5.0 | −10.0 | 2/14/48 hr. |
| 6 | 1.0 Glass | No | — | 1750 | 0.30 | −7.0 | −5.0 | 8/8/24 hr. |
| 7 | 1.0 Glass | Yes | 0.3 | 1830 | 0.25 | −7.0 | −5.0 | 0/12/500 hr. |
| 8 | 0.5 Glass | Yes | 0.5 | 2000 | 0.20 | −7.0 | −11.0 | 0/12/200 hr. |

Figure 3:
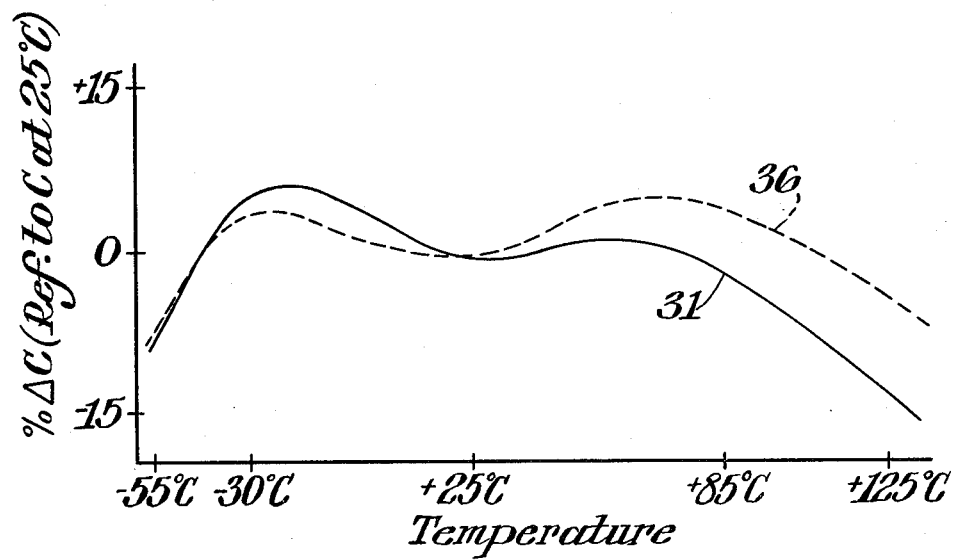
FIG. 3 is a graph showing the change in capacitance as a function of operating temperature for two capacitors of this invention.

The results of accelerated life tests to which a number of the experimental capacitors of each group were subjected are also presented in Table 1. Life test conditions consisted in applying 200 volts to each capacitor held at a temperature of 125° C. Failure of a capacitor was defined as the event wherein the normallized insulation resistance of a capacitor fell below 30 ohm-farads. By modern standards, high quality ceramic capacitors will survive at least 100 hours under these conditions before failure. The actual time under test is indicated in Table 1. The unannealed capacitors of groups 2, 4 and 6 exhibited a high rate of failure, because small amounts of free lead oxide remain in the sintered body. The capacitors of groups 4 and 5, did not completely densify and were slightly porous because of the relatively large additive amount of titania, which was responsible for the low insulation resistance and poor life test performance. There were no failures of annealed capacitors of experimental groups 1, 3, 7 and 8, the open atmosphere annealing step having driven out the lead oxide. All capacitors exhibited a temperature coefficient of capacitance (TCC) that conforms to the above noted standard X7R characteristic, namely, with respect to room temperature capacitance, the capacitance variation remained within ±15% over the operating temperature range of −55° C. to 125° C. Representative of capacitors of this invention, the TCC curves 31 and 36 corresponding to capacitor groups 1 and 6, respectively, are shown in FIG. 3.

What is claimed is:

1. A method for making a PLZT ceramic capacitor comprising:

(a) forming a powder blend consisting essentially of precursors of a single antiferroelectric compound of lead-barium-lanthanum-zirconate-titanate doped with silver and bismuth;

(b) calcining said blend in a closed container at a peak temperature of less than 1130° C. to form said antiferroelectric compound;

(c) pulverizing said calcined compound;

(d) forming a body of said pulverized compound;

(e) sintering said body in a closed container;

(f) annealing said sintered body in an open atmosphere at less than 1000° C. to drive out the free lead oxide residing in said body; and (g) forming two spaced electrodes in contact with said body.

2. The method of claim 1 wherein said forming a powder blend includes proportioning said precursors to provide about equal molar quantities of large cations consisting of lead, barium, lanthanum, silver and bismuth, and small cations consisting of titanium and zirconium.

3. The method of claim 1 wherein said annealing is accomplished at about 950° C.

4. The method of claim 1 wherein said powder blend consists of PbO, BaO, La$_2$O$_3$, ZrO$_2$, TiO$_2$, Ag and Bi$_2$O$_3$.

5. The method of claim 4 wherein the positive ions of said oxides are in the approximate relative atomic amounts of 0.78 Pb, 0.11 La, 0.07 Ba, 0.02 Ag, 0.02 Bi, 0.64 Zr and 0.36 Ti.

6. The method of claim 1 wherein said peak calcining temperature is greater than 1000° C.

7. The method of claim 1 wherein said bismuth in said start materials is at least 0.7 mole percent of the large cations consisting of said lead, barium, bismuth, lanthanum and silver.

8. The method of claim 1 wherein said sintering is accomplished at a peak temperature of from 1050° C. to 1120° C.

9. The method of claim 1 wherein said lanthanum is about 11 mole percent of the large cations in said powder blend.

* * * * *

UNITED STATES PATENT AND TRADEMARK OFFICE
CERTIFICATE OF CORRECTION

PATENT NO. :   4,324,750
DATED      :   April 13, 1982
INVENTOR(S):   Galeb H. Maher It is certified that error appears in the above—identified patent and that said Letters Patent is hereby corrected as shown below:

Columns 5 and 6, Table I, under the Heading - Additive to Calcined Powder (wt %) for Experiment Number 4, "$0.1TiO_2$" should read -- $1.0TiO_2$ --

*Signed and Sealed this*

*Twenty-second* Day of *June 1982*

[SEAL]

Attest:

GERALD J. MOSSINGHOFF

*Attesting Officer*     *Commissioner of Patents and Trademarks*